Aug. 12, 1952  J. M. TYRNER  2,606,754
GAS TORCH MACHINE FOR CUTTING STRUCTURAL SHAPES
Filed Sept. 3, 1948                                           10 Sheets-Sheet 1
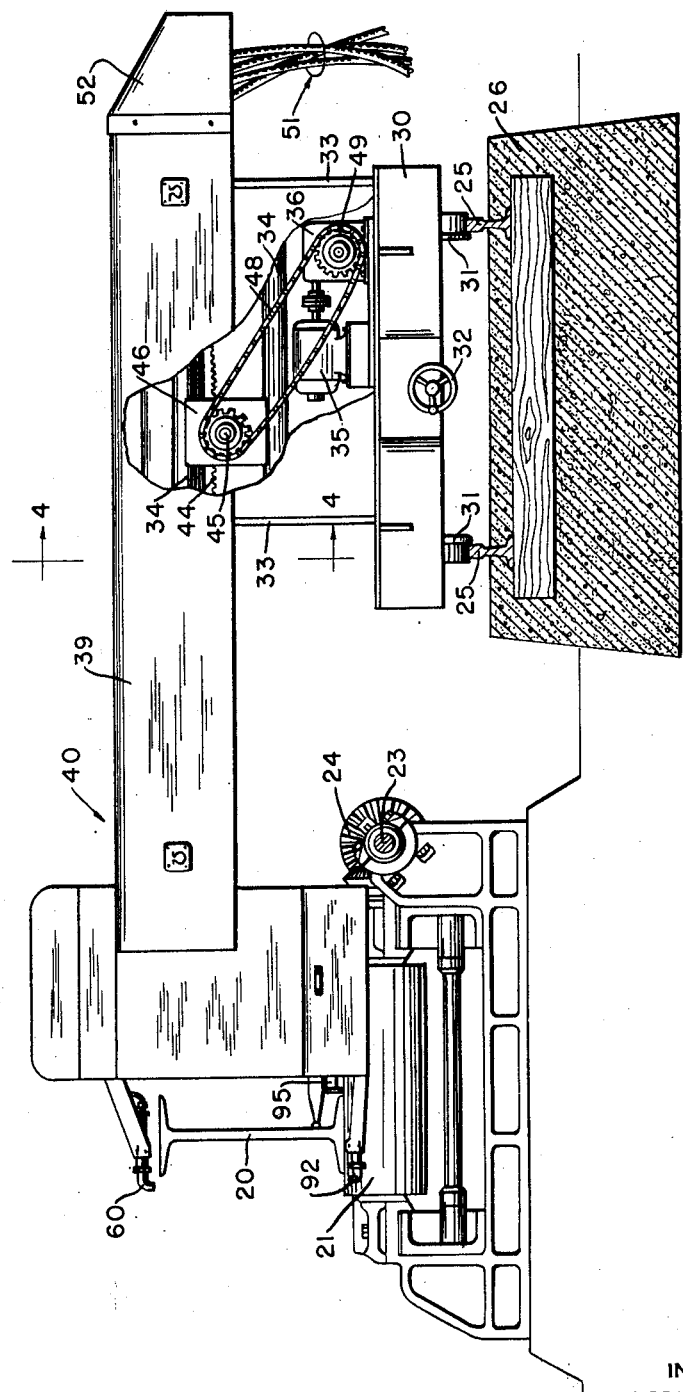
FIG. I
INVENTOR
JOSEPH M. TYRNER
BY
ATTORNEYS

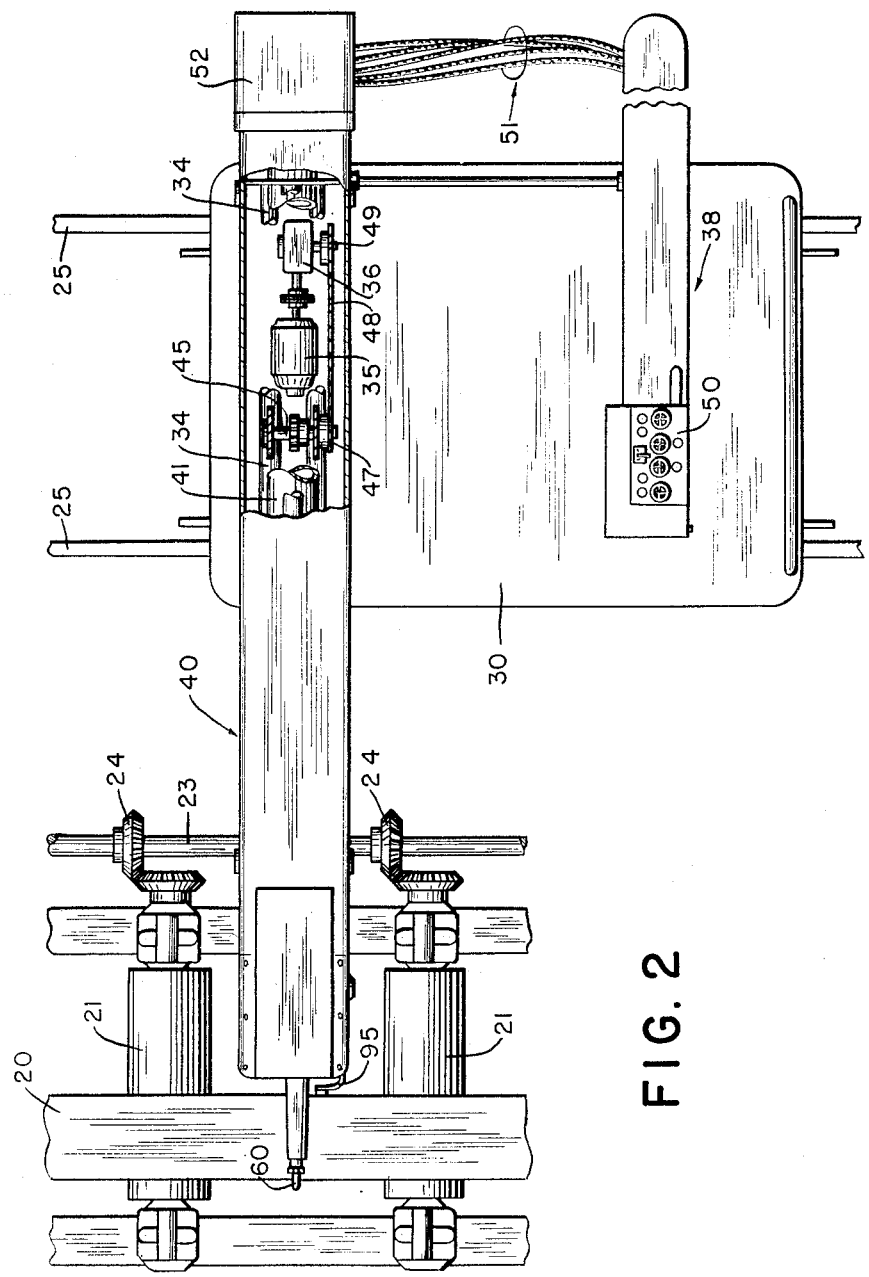

Aug. 12, 1952        J. M. TYRNER        2,606,754

GAS TORCH MACHINE FOR CUTTING STRUCTURAL SHAPES

Filed Sept. 3, 1948        10 Sheets-Sheet 3

INVENTOR
JOSEPH M. TYRNER
BY
ATTORNEYS

INVENTOR
JOSEPH M. TYRNER

Aug. 12, 1952   J. M. TYRNER   2,606,754
GAS TORCH MACHINE FOR CUTTING STRUCTURAL SHAPES
Filed Sept. 3, 1948   10 Sheets-Sheet 5

INVENTOR
JOSEPH M. TYRNER
BY
ATTORNEYS

Aug. 12, 1952     J. M. TYRNER     2,606,754
GAS TORCH MACHINE FOR CUTTING STRUCTURAL SHAPES
Filed Sept. 3, 1948     10 Sheets-Sheet 7

INVENTOR
JOSEPH M. TYRNER
BY
ATTORNEYS

Aug. 12, 1952  J. M. TYRNER  2,606,754
GAS TORCH MACHINE FOR CUTTING STRUCTURAL SHAPES
Filed Sept. 3, 1948  10 Sheets-Sheet 8

INVENTOR
JOSEPH M. TYRNER
BY
ATTORNEYS

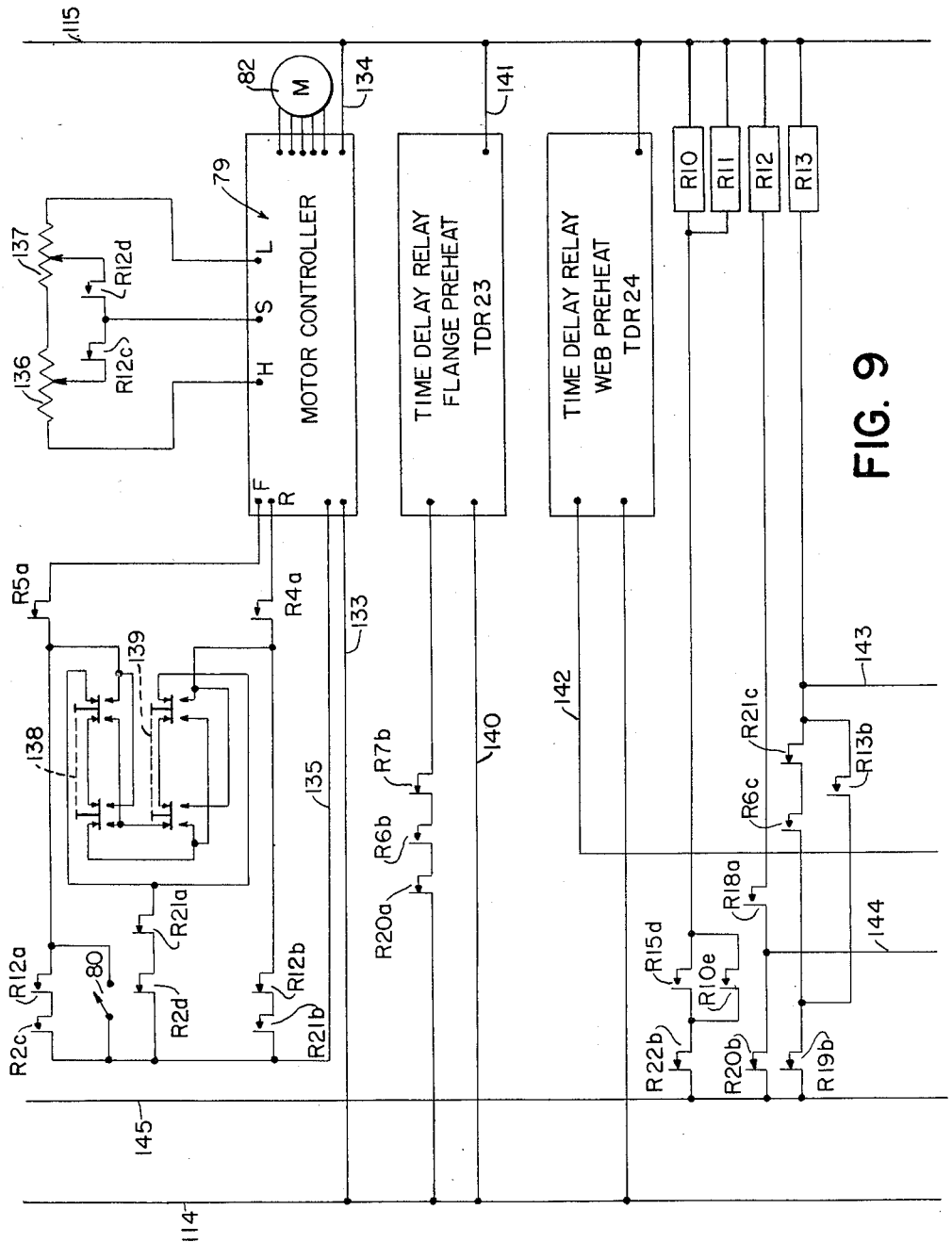

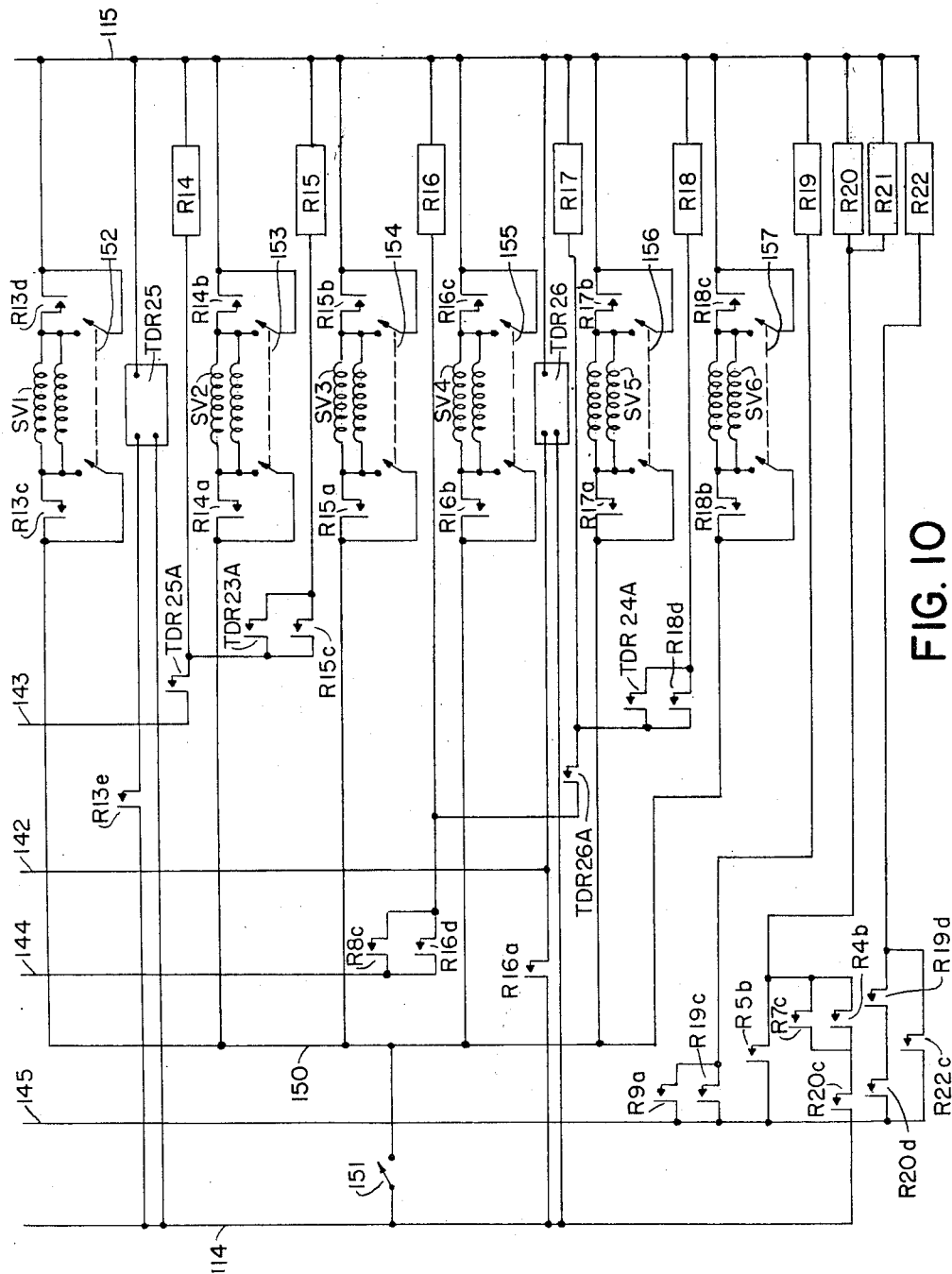

Patented Aug. 12, 1952

UNITED STATES PATENT OFFICE 2,606,754

GAS TORCH MACHINE FOR CUTTING STRUCTURAL SHAPES

Joseph M. Tyrner, New York, N. Y., assignor to Air Reduction Company, Incorporated, a corporation of New York Application September 3, 1948, Serial No. 47,656

14 Claims. (Cl. 266—23)

This invention relates to automatic cutting machines of the thermal gas torch type and more especially to such machines which are adapted to cut metal workpieces of generally symmetrical cross-section, for example, metal known as "structural shapes."

In the course of fabricating structural shapes of steel and other metals, such as I, H and channel sections, it is necessary to cut the members into the desired lengths and also to cut off imperfect ends. In modern rolling mills very little time is available for making these cuts, if the other steps in the fabrication are carried out at maximum production speed.

The cutting machine of the present invention provides accurate and efficient cutting of any of the usual structural metal shapes entirely automatically and with such speed as not to interpose a "bottleneck" in the production schedule.

In accordance with the invention, cutting torches movable in different directions may be adjusted to cut different sections of the workpiece simultaneously. Mechanism is provided by which the several torches are automatically moved into proper cutting positions, preheating gases turned on for a predetermined period, and then cutting gases applied until the workpiece is severed, after which the torches are automatically returned to their starting positions.

The invention will be better understood by reference to the following specification considered in connection with the drawings, wherein:

Fig. 1 is an elevational view of the machine of the invention upon completion of the cut of an I-beam, a portion of the machine being shown cut away to illustrate the construction;

Fig. 2 is a plan view, partly broken away, of the machine of Fig. 1;

Figure 7:
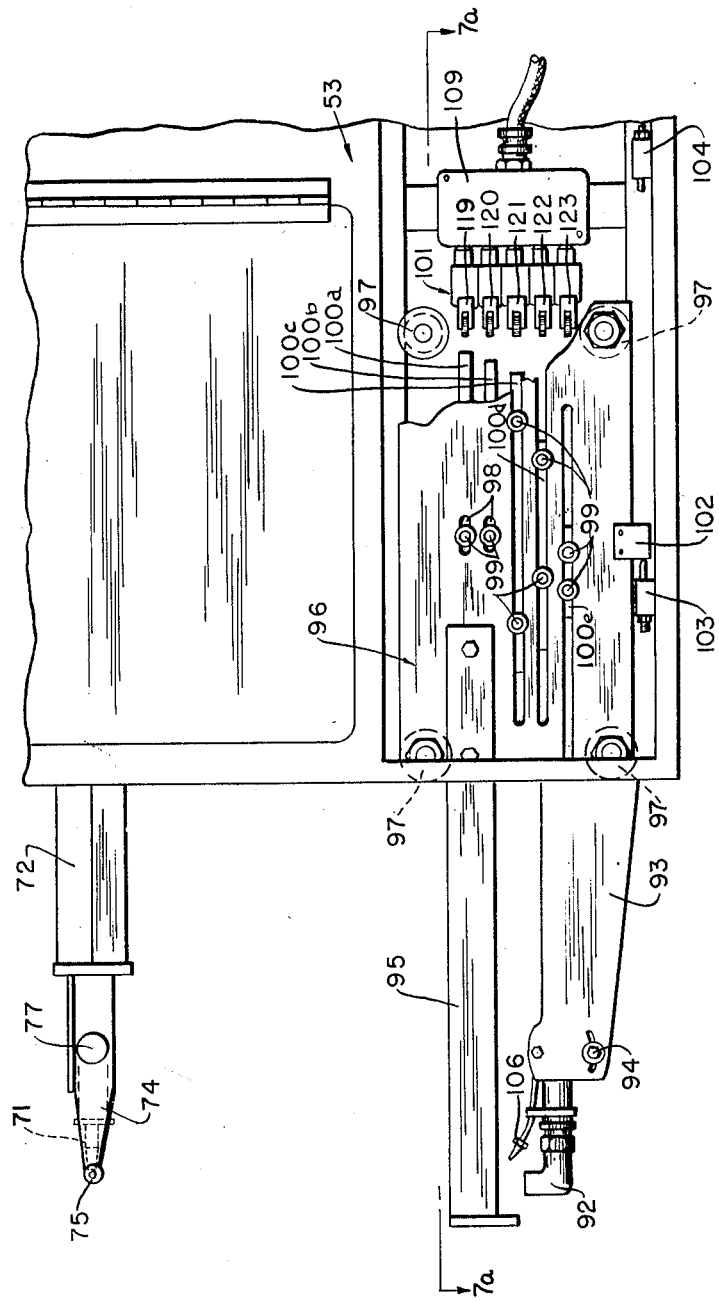
Fig. 7 is a detailed view of the lower portion of the ram head.
Figure 7A:
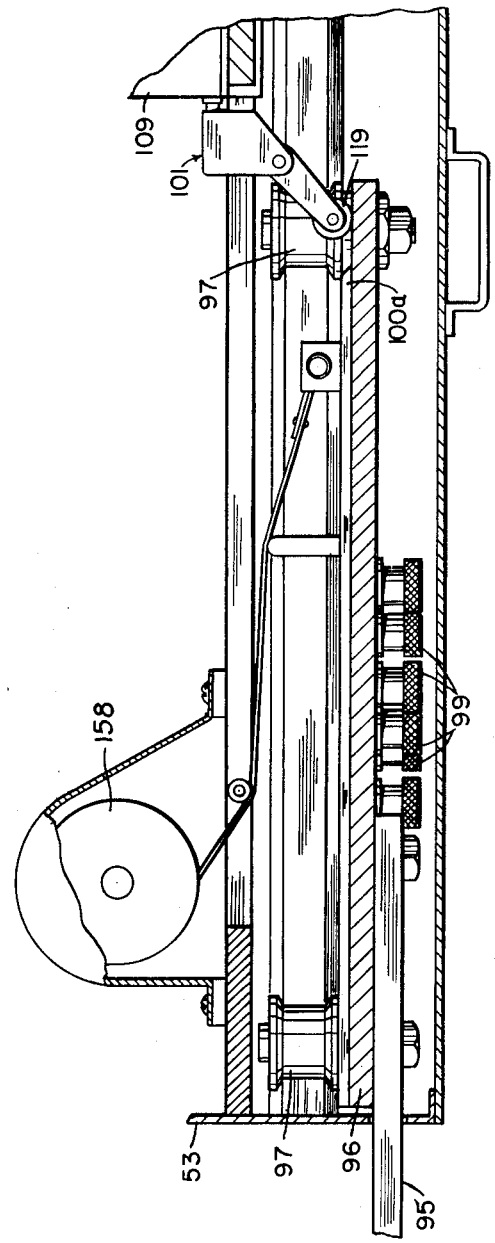
Figure 8:
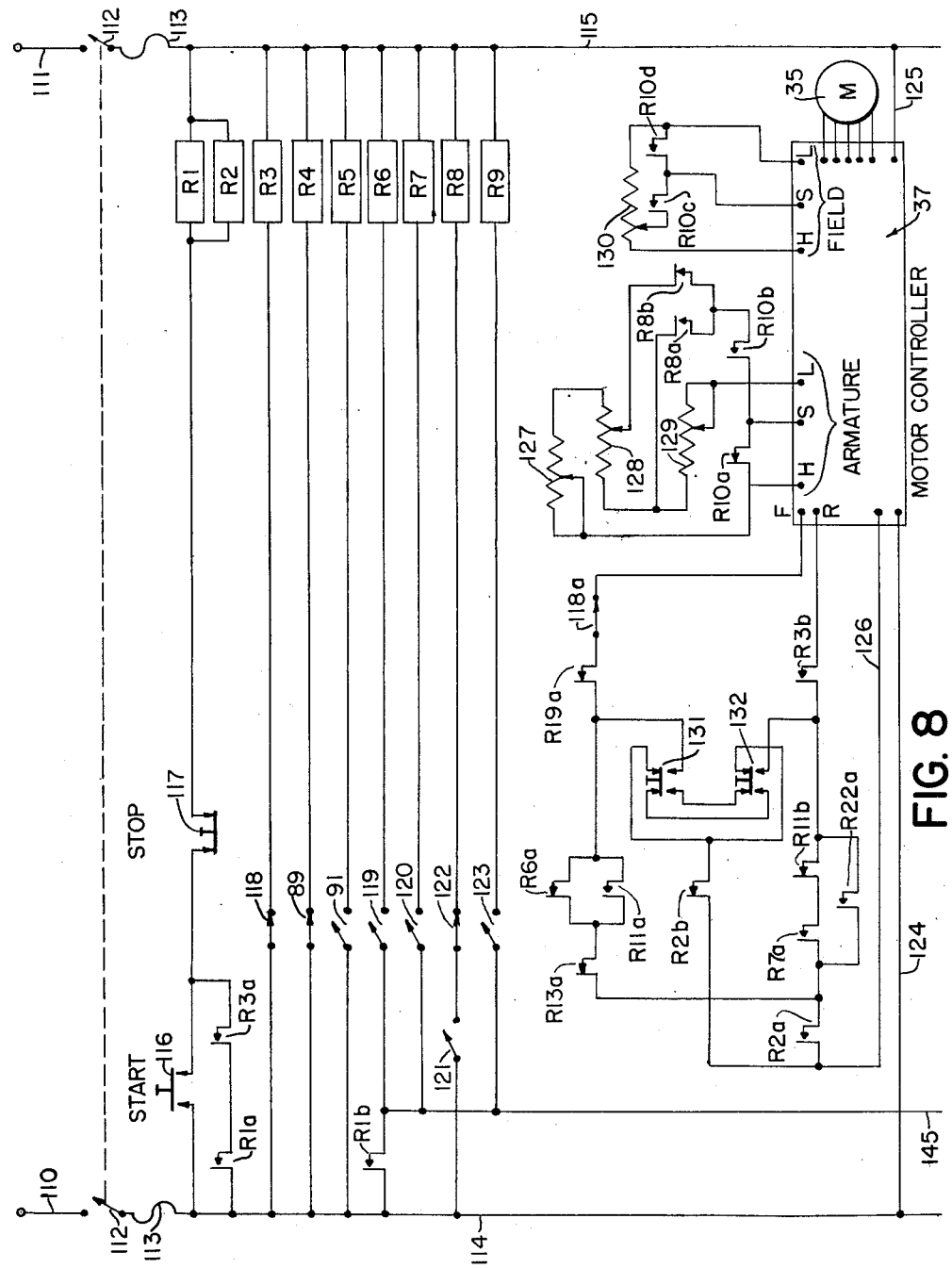

Fig. 7a is a fragmentary view partly in cross-section, taken along the line 7a—7a of Fig. 7; and Figs. 8, 9 and 10 together comprise an across-the-line circuit diagram of the electrical control system of the machine, Figs. 9 and 10 being each a continuation of the preceding figure.

The cutting machine of the invention is herein illustrated and described in connection with the cutting of a structural shape known as an I-beam, but as stated above, by making suitable adjustments provided for, it may be adapted to cut any other of the usual structural shapes. In general, the machine comprises a base which supports a bed on which the workpiece rests and a ram movable horizontally. The ram supports a carriage movable vertically in respect thereto. Two torches and a probe are mounted on the front end of the ram, and another torch is mounted on the carriage. As the ram moves forward the probe contacts a certain portion of the workpiece to be cut, and remains there. As the ram continues to move forward this probe, sliding rearwardly of the ram, causes the actuation of a series of electric switches which control the horizontal movement of the ram, the vertical movement of the carriage, the preheating period, and the actuation of the valves controlling the preheating and cutting gases.

Referring first to Figs. 1 and 2, the workpiece comprising I-beam 20 is shown in cutting position on rolls 21 supported on roll table 22. Rolls 21 are driven by a drive shaft 23 through bevel gears 24. Thus, by proper manipulation of the table, the workpiece 20 may be brought to rest at any desired position. The motor for driving the shaft 23 and the controls therefor may be of usual types and have not been illustrated.

Behind roll table 22 and parallel to it is a track consisting of two rails 25 (Fig. 1) securely mounted on a platform 26. The base for the cutting machine of the present invention comprises a carriage 30 having flanged wheels 31 which roll on rails 25. This carriage may be motor driven or may be moved manually. Means for driving carriage 30 are not shown. It is desirable that friction brakes be provided to prevent wheels 31 from rotating so as to lock the carriage in any desired location while making a cut. Such brakes are not illustrated in the drawing, but hand wheel 32 (Fig. 1) is arranged to actuate the brakes. Also supported on carriage 30 is a motor 35, which, through reduction gear unit 36, drives a ram 40. This ram includes a tubular member 41 (Figs. 3 and 4) mounted to slide axially (horizontally) through two sets of rollers in a framework on carriage 30, which includes two side plates 33, one of which faces the roll table.

Figure 4:
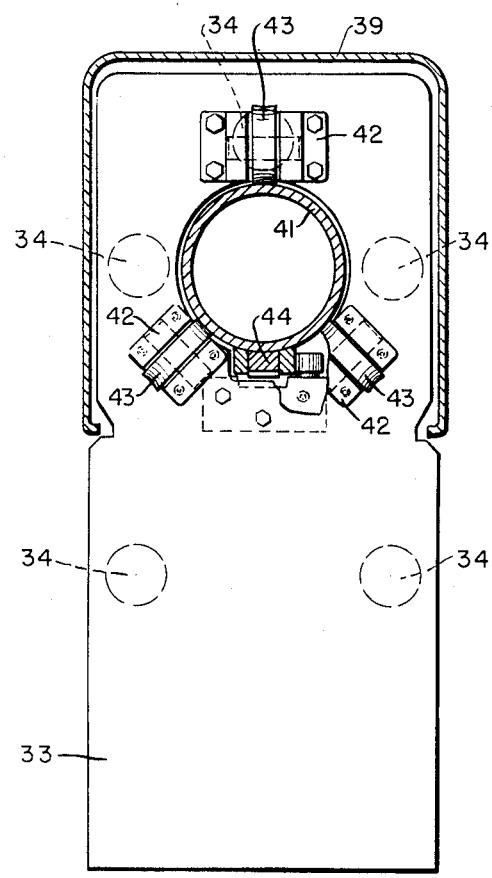
Fig. 4 is an enlarged sectional view taken along the line 4—4 of Fig. 1.
Figure 3:
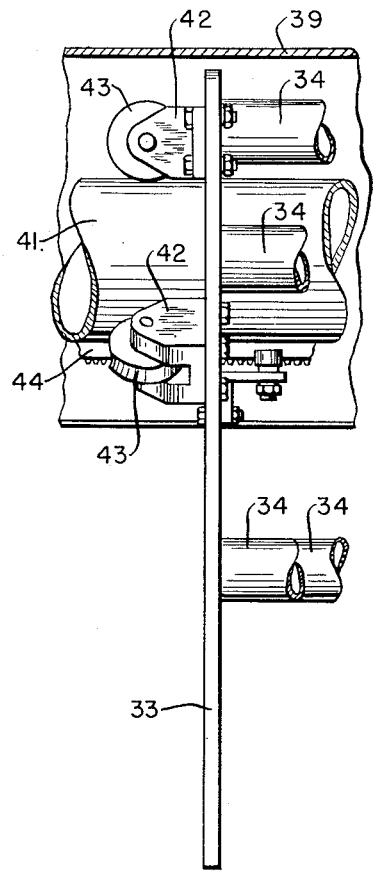
Fig. 3 is an enlarged view in elevation of one portion of the machine.

In one of the side plates 33 which faces the roll table is a hole sufficiently large to permit free passage of sliding tubular member 41 (Figs. 3 and 4). On this same side plate three brackets 42 are secured and spaced around the mentioned hole, and each bracket supports a roller 43 to guide and support tubular member 41. A similar set of rollers (not shown) on the opposite (rear) side plate of the framework taken together with those just mentioned, comprises a slide box for the ram permitting it to move horizontally toward and away from the roll table on which the workpiece is supported. A rack gear 44 attached to the lower side of tubular member 41, is driven by a pinion gear (not shown) which is mounted on shaft 45. This shaft is supported on brackets 46 which are attached to tubular braces 34. Also attached to shaft 45 is a sprocket 47 which is linked to sprocket 49 by a drive chain 48. Sprocket 49 thus is driven by motor 35 through reduction gear unit 36, permitting the ram to be moved horizontally in either direction through the slide box by operating motor 35. A dust cover 39, attached to the ram at the rear end and at the head, slides with the ram.

Also mounted on carriage 30 are the operator's pulpit 38 (Fig. 2) and the gas and electrical control cabinets. These cabinets are not illustrated, but the control panel 50 would be connected to them. Flexible tubes 51 interconnect the control cabinets and the rear end of the ram, sufficient slack being allowed in the tubes to permit adequate movement of the ram. In the arrangement shown, all of the gas lines and electrical cables enter the ram at the rear end under hood 52 and pass through the interior of tubular member 41 to the head of the ram.

Figure 5:
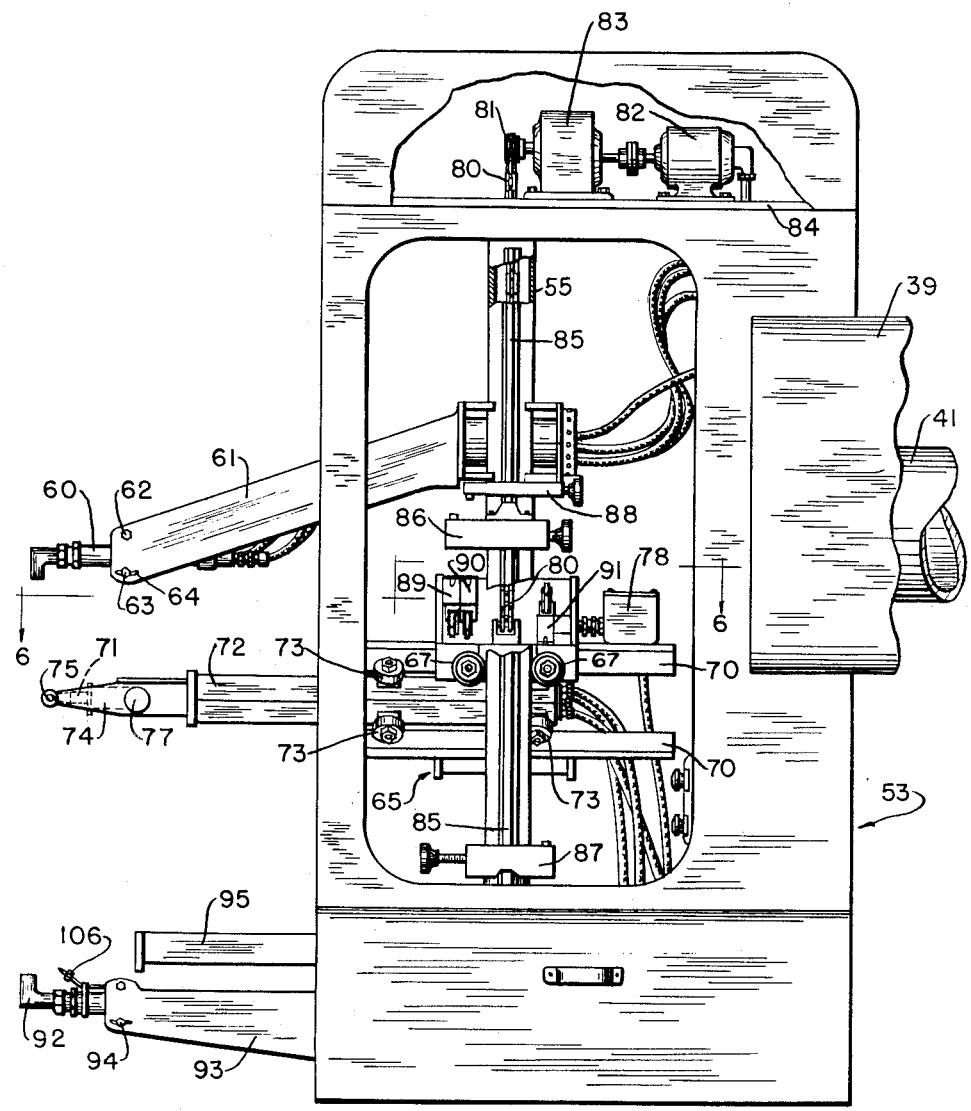
Fig. 5 is a side view in elevation of the ram head.
Figure 6:
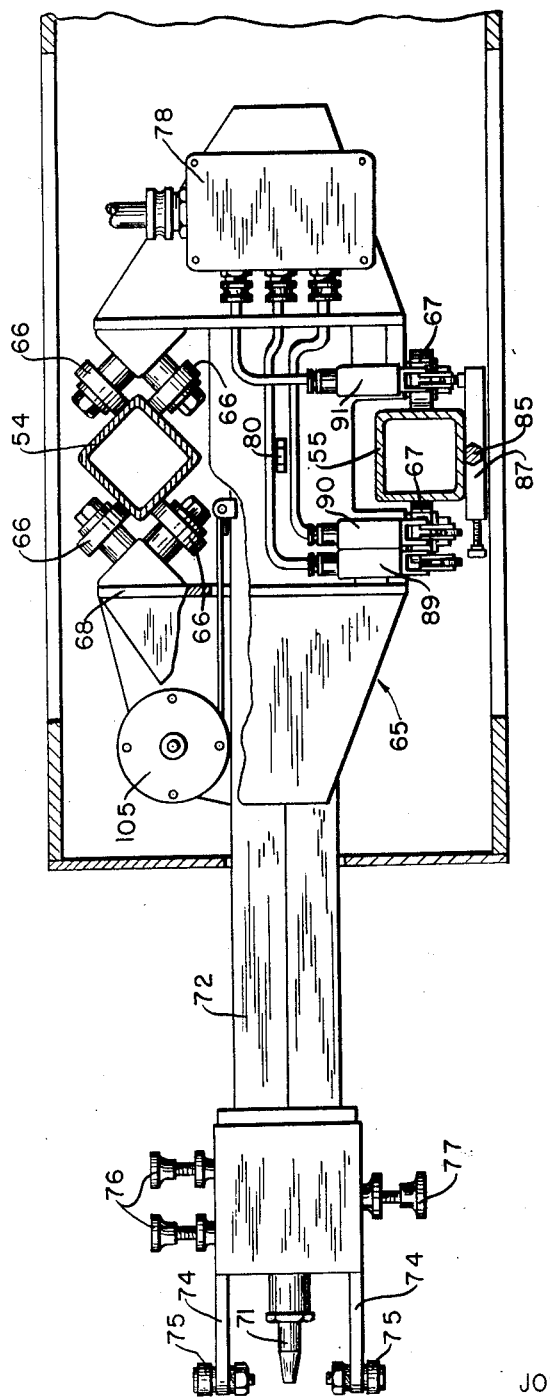
Fig. 6 is a sectional view taken along the line 6—6 of Fig. 5.

The head end of the ram is illustrated in Figs. 5, 6 and 7 and includes a frame 53 securely attached to the end of tubular member 41. Within this frame are included supporting means for the required number of torches (three, in this instance), mounting means for the probe, mechanism for vertically moving the torch carriage and the electrical switches for controlling the operation of the machine. Also within frame 53 are two fixed, vertical, rectangular support members 54 and 55 (Fig. 6), member 54 being mounted diagonally with respect to frame 53. Torch 60 (here referred to as the "top flange torch" because it is arranged to cut the top flange of the I-beam) is fastened to arm 61 which slidably clamps on support members 54 and 55. Thus torch 60 may be manually adjusted vertically to cut structural shapes of different heights. Torch 60 is secured to arm 61 by two bolts 62 and 63, as shown in Fig. 5, arranged so that the torch swings on bolt 62 as a pivot. Bolt 63 slides within arcuate slot 64 to permit limited angular adjustment of torch 60 which may be clamped in position by tightening bolt 63.

Below arm 61 is a carriage 65 arranged to roll vertically on members 54 and 55 so as to carry torch arm 72 and torch 71 up and down. Carriage 65 is guided by four rollers 66 (Figs. 6) which roll along the four surfaces of vertical member 54 and by two rollers 67 which roll along to opposing faces of vertical member 55. These rollers are all suitably attached to carriage frame 68. Also supported on carriage frame 68 are four rails 70 (Fig. 5) which are disposed horizontally in the form of a rectangle positioned between the mentioned vertical members. Torch 71 (here referred to as the "web torch" because it is arranged to cut the web of the I-beam) is, as above mentioned, supported on torch arm 72 which in turn is provided with rollers 73 engaging rails 70 to permit limited horizontal movement of torch 71 with respect to carriage 65 independently of the vertical movement or position of the carriage.

Extending from the forward end of torch arm 72 is a pair of spacers 74 of which the effective length can be adjusted by manipulation of adjusting screws 76 and 77. At the end of each of the spacers 74 is a roller 75 permitting the spacers to roll up and down on the surface of the workpiece with minimum friction. By adjusting the length of spacers 74, the correct distance of the torch 71 from the workpiece can be set and automatically maintained as long as the rollers 75 are in contact with the workpiece. Helical spring 105 which is secured to frame 68 and arm 72 resiliently urges that arm and hence, rollers 75 forwardly toward the workpiece.

Carriage 65, including the web torch slide box assembly above described, is supported vertically by a chain 80 (Fig. 5). This chain passes over a sprocket 81 which is driven by motor 82 through reduction gear unit 83. This motor with its reduction gear is securely fastened to a platform 84 which is preferably welded to the top of frame 53. When motor 82 is energized the entire carriage 65 is either raised or lowered, depending upon the direction in which the motor is rotated. A bar 85, conveniently of hexagonal cross-section, is attached to the outer face of the rectangular vertical member 55 (Figs. 5 and 6). Along this bar 85 a suitable number of stops 86, 87, 88 are slidably securable. These stops are positioned and are shaped so as to cooperate with and selectively actuate certain electric switches 89, 91 and 90, respectively, when the switches are engaged by their respective stops. These switches are connected through connection box 78 (Fig. 6) to electrical control mechanism which provides the automatic operation hereinafter described.

Torch 92 (here referred to as the "lower flange torch" because it is arranged to cut the lower flange of the I-beam) is attached to fixed torch arm 93 (Fig. 7) by a swivel mounting including the adjusting bolt 94, in the same manner that upper torch 60 is mounted.

Also within the frame 53 is a probe arm 95 (Fig. 7) which is bolted to a flat slide plate 96 carrying a roller 97 on each of its corners. These rollers hold the plate in a fixed vertical position within the frame, but permit it to slide horizontally. Plate 96 contains a suitable number of longitudinal slots 98 of various lengths as illustrated. These slots are proportioned to accommodate a bolt or bolts 99 attached to movable stops 100a, b, c and d. By tightening thumb screws on the top of bolts 99 the stops may be secured to plate 96 in preselected positions to engage a bank 101 of switches 119–123, inclusive. Suitable connecting wires from switches 119–123 pass through connection box 109, and serve to connect these switches to the electrical control mechanism which provides the mentioned automatic operation. Another stop or dog 102, projecting from the edge of plate 96, engages limiting stops 103, 104.

After the workpiece 20 has been properly positioned on the supporting rolls 21, it can be moved longitudinally to permit any selected section thereof to be placed directly in front of the cutting torches. To the same end, the entire machine may also be moved in a direction parallel to the longitudinal axis of the workpiece by moving the machine along tracks 25 (Fig. 1) as above explained. Ram 40 may be advanced or retracted by operating ram drive motor 35 in either direction. As the ram advances toward the workpiece, probe 95 comes into contact with, preferably, the nearest surface of the workpiece (here the edge of the lower flange) and, while the ram continues to advance, is held there by a helical spring 158, Fig. 7a, similar to spring 105 above described.

By means of the control mechanism described below, the forward motion of the ram is stopped at a point where the preheat flames of the two flange torches, one at the top and one at the bottom of the I-beam, play on the edges of the flanges to be cut. The torches are ignited by suitable pilot flames, such as provided by gas pilot 106 secured to torch 92. The preheat interval is determined by the adjustment of a time delay relay which trips at the end of the delay period, ending the preheat period, and the ram resumes its forward motion at cutting speed. At the same time the cutting gas is applied to the torches so that they cut across both flanges simultaneously until the web section is reached. At this point the probe operates a switch which results in reducing the speed of the forward motion of the ram and turning on the preheat gas to the web torch. After a preset time interval determined by another time delay relay the cutting gas is supplied to the web torch. When the flange torches have passed the web section the ram resumes its original cutting speed and moves them across the uncut portions of the I-beam flanges. When the web torch is furnished with cutting gas this torch begins its downward movement, cutting the web of the I-beam. When the flange torches reach the ends of the cuts on the flanges, a limit switch is actuated, stopping the forward motion of the ram and turning off the cutting and preheat gases to the flange torches. Meanwhile, the web torch continues its downward movement until it reaches the bottom of the web, at which point the I-beam is completely severed, and a limit switch is actuated to reverse the motion of the ram, causing it to retract to its original position and also causing return of the carriage to its original position.

The mechanism which automatically controls the operation of the cutting machine of the invention is represented in Figs. 8, 9 and 10, which together constitute a single circuit diagram. Referring to this diagram, a source of power represented by conductors 110, 111 is connected through a double-pole line switch 112 to suitable circuit breakers or fuses 113, so that when this main switch is closed, conductors 114 and 115 are energized to supply current to the various circuits of the machine. Connected in series across the line are a "start" push button 116 (normally open), a "stop" push button 117 (normally closed) and a pair of relays R1 and R2 connected in parallel with each other. When relay R1 is deenergized, relay contacts R1a and R1b are open. When relay R2 is deenergized, relay contacts R2a, R2c are open and contacts R2b and R2d are closed. Start button 116 is bypassed by normally open relay contacts R1a and R3a.

Relay R3 is connected across the line in series with the ram limit switch 118. This limit switch is closed when the ram is retracted to the limit of its movement away from the workpiece. It is not shown in the drawings of the machine because it is attached to the main frame under the hood which covers the ram, but it is actuated by a lug secured to the ram when the ram reaches the mentioned limiting position. Another similar limit switch 118a limits the travel of the ram in the forward direction. Therefore, with the ram in starting position, at which point switch 118 is closed, the relay R3 is energized and contacts R3a and R3b are open. As soon as the ram moves from its starting position, limit switch 118 opens, closing contacts R3a and R3b. Relay R4 is similarly connected across the line in series with web-torch limit switch 89. This switch is closed when the web-torch carriage is raised to the limit permitted by the setting of stop 86. When relay R4 is thus energized, contacts R4a and R4b are held open. Relay R5 is connected across the line in series with web carriage stop switch 91. This switch is actuated when the web torch carriage 65 moves downwardly to a point determined by the setting of stop 87. When relay R5 is deenergized, contacts R5a are closed and contacts R5b are opened. Relay R6 is connected in series with switch 119, which is one, in the bank 101, of the switches which are actuated by probe stops 100a–d, inclusive. Contacts R–6a of relay R6 are closed when this relay is deenergized, at which time contacts R6b and R6c are opened. Relay R6 and switch 119 are not connected directly across the power line, but are series-connected across the line with relay contacts R1b. Relays R7 and R9 are connected across the line in series with limit switches 120 and 123 and are also connected in series with relay contacts R1b. Relay R8 is connected across the line in series with normally closed switch 122 and normally open switch 121.

The controls more especially associated with the ram-drive motor 35 are shown in Fig. 8. Motor 35 is a direct-current motor energized and controlled through a motor controller 37, which may be of any suitable type preferably employing gas-filled tubes. An example of such a control unit is the General Electric Company "Thymatrol." This unit may be energized directly from the A. C. power line by conductors 124 and 125. A third conductor 126 connects a power terminal on the motor controller unit to a series of relay contacts which control the connection of electric power to the motor and also the direction of motor rotation. The motor speed is determined by the resistance introduced into the armature and field circuits, as by variable resistors 127, 128, 129 and 130. The manner of operation of the relay contacts which control the motor is described hereinafter. Push buttons 131 and 132 permit the ram motor to be "jogged" forward or in reverse independently of the other controls, if required.

In a similar manner the controls for the web carriage motor 82 are represented in Fig. 9 Motor 82 is also a direct-current motor which is energized through and controlled by another motor controller 79 which may likewise be of the mentioned "Thymatrol" type. This controller derives its power from the A. C. power lines through conductors 133 and 134. A third conductor 135 connects the power terminal on the motor control unit to a series of relay contacts which control the power to the web-carriage motor as well as the direction of motor rotation. The speed of motor 82 is determined by the resistance introduced into the circuits thereof, this resistance, here comprising variable resistors 136 and 137 which are connected to the armature. The manner in which the various relay contacts control motor 82 is described hereinafter. Push buttons 138 and 139 permit the web carriage motor 82 to be "jogged" up or down independently of the other motor controls.

Relay TDR23 comprises a flange preheat time delay relay, and is connected across the power line by conductors 140 and 141. Connected in series with this relay are relay contacts R6b normally open, and contacts R20a and R7b, normally closed. Similarly, web-preheat time delay relay TDR24 is connected across the power line. Conductor 142, which connects with the terminal of time delay relay TDR24 that initiates the cycle, forms part of a parallel circuit with another time delay relay TDR26, hereinafter described. Both of these last-mentioned time delay relays are connected to the line in series with relay contacts R16a, normally open.

Relays R10 and R11 are connected in parallel with each other, and are also connected across the line in series with relay contacts R1b (Fig. 8) normally open, contacts R22b normally closed, and contacts R15d normally open. Shunting contacts R15d are relay contacts R10e, also normally open. Relay R12 is connected across the line through relay contacts R18a normally open, contacts R20b normally closed, and contacts R1b normally open. Relay R13 is connected across the line through relay contacts R21c and R19b normally closed, contacts R6c normally open, and contacts R1b normally open.

The flow of oxygen and acetylene, or other suitable cutting gas, is controlled preferably by solenoid valves. These valves may be arranged to be actuated by manually controlled switches on the control panel independently of the automatic controls, as below described, but they are normally actuated automatically by the relay circuits herein illustrated. For example, solenoid valve SV1 (Fig. 10) controls the flow of acetylene to the preheat passages of the flange torches. This, as well as the other solenoid valves can be energized only when switch 151 is closed, as this switch connects line conductor 114 to conductor 150 which is a common energizing lead for all of the solenoid valves. As shown in the diagram, when switch 151 is closed, solenoid valve SV1 can be energized by closing relay contacts R13c and R13d. The remaining solenoid valves SC2-SV6, inclusive, are similarly connected and are each controlled by being connected in series with two relay contacts as represented in the diagram. Of these valves, SV2 controls the preheat oxygen to the flange torches, SV3 controls cutting oxygen to the flange torches, SV4 controls acetylene to the web torch, SV5 controls preheat oxygen to the web torch, and SV6 controls cutting oxygen to the web torch. Test switches 152-157, inclusive, permit energization of the respective solenoid valves SV1 to SV6, inclusive, so that any of the mentioned gas lines can be opened manually.

Control relays R14 to R22, inclusive, represented in Fig. 10, are connected across the power line through various combinations of interlocking relay contacts, as shown in the diagram, and their specific connections need not, therefore, be here further described. However, the manner in which the entire system operates in order, for example, to cut an I-beam automatically, will now be described as a complete cutting cycle.

*Operation*

Assuming that the ram 40 is in its fully retracted position and that the web-torch carriage is raised as far upwards as the setting of stop 86 permits, all of the electrical control switches and contacts will be in the normal position illustrated in the circuit diagram (Figs. 8, 9 and 10). To initiate a cutting cycle, line switch 112 should, of course, be closed, and since ram limit switch 116 is also closed when the ram is in its fully retracted position, relay R3 will immediately be energized. Likewise, since the web-torch carriage is also retracted upwardly, limit switch 89 is closed so that relay R4 also is immediately energized. Switch 151 (Fig. 10) should next be closed, although this will have no immediate effect on the operation.

To commence operation of the cutting machine, start button 116 is depressed to close the circuits of relays R1 and R2. This closes relay contacts R1a and R1b, R2a and R2c, and opens relay contacts R2b, R2d. When contacts R2a close, ram motor 35 is energized for forward rotation through conductor 126, contacts R2a, R13a, R6a, R18a and switch 118a to terminal F of motor controller 37. Ram motor 35 (Fig. 1) will then drive ram 40 at full speed, through reduction gear 36, chain 48, and the pinion gear working in rack 44. As the ram moves away from its initial limiting position, limit switch 118 opens, deenergizing relay R3. This closes relay contacts R3a, locking the start button circuit closed (contacts R1a having previously been closed). The ram, therefore, continues to advance even though start button 116 is released.

When the ram has advanced sufficiently far, probe 95 strikes against the nearest edge of the lower flange on the structural workpiece 20 to be cut, and the ram continues to advance while the probe is held stationary, causing relative movement between the probe and the ram. As the ram continues to advance, the first of the probe stops 100a, trips switch 119 of the bank of switches 101. With switch 119 thus closed, relay R6 is energized, opening contacts R6a and closing contacts R6b and R6c. The opening of contacts R6a opens the circuit to the ram motor, thus stopping the ram. The simultaneous closure of contacts R6b energizes time delay relay TDR23, and the closure of contacts R6c closes the circuit to relay R13. The resulting actuation of relay R13 opens contacts R13a and closes contacts R13b, R13c, R13d and R13e. The closing of contacts R13c and R13d energizes solenoid valve SV1, admitting acetylene to the flange torches which are automatically lighted from pilot 106 or pilots similar thereto. The closure of contacts R13e energizes time delay relay TDR25, permitting acetylene to flow before the oxygen is turned on, which is the correct procedure for lighting this type of torch. At the expiration of the preset delay period of relay TDR25, contacts TDR25a close, energizing relay R14. Relay contacts R14a and R14b are thereby closed, permitting solenoid valve SV2 to open, thus admitting preheat oxygen to the flange torches 60 and 92. At this point in the operation, the ram is stationary and the preheat flanges of the flange torches are preheating the edges of the flanges preparatory to starting the cut. Time delay relay TDR23 controls the preheat period for this operation.

Should the inertia of the ram carry the flange torches beyond the proper position for preheating the workpiece, the second probe stop 100b will close switch 120. This energizes relay R7 closing contacts R7a and R7c and opening contacts R7b. The opening of contacts R7b opens the circuit to relay TDR23 and prevents it from operating until the ram is properly positioned. The closing of contacts R7a closes the circuit to terminal R on motor controller 37, reversing the motor so as to return the ram automatically to the proper preheating position.

When the correct preheat period is terminated by relay TDR23, contacts TDR23a close, energizing relay R15 which is immediately locked in by its own contacts R15c. Contacts R15a and R15b also close, energizing solenoid valves SV3, admitting cutting oxygen to the flange torches and thereby starting the cuts. Contacts R15d close at the same time, energizing relays R10 and R11. Actuation of relay R11 closes contacts R11a, again completing the circuit to terminal F of the ram motor controller 37, permitting the motor to resume driving the ram forward, and opening contacts R11b which are connected in the ram motor reverse circuit, thereby preventing the ram from reversing again when the switch 120 is again closed as the ram advances. Actuation of relay R10 opens contacts R10a and closes contacts R10b, R10c and R10d which connects the correct value of resistance in the ram motor armature and field circuits, thus actuating the ram at the preselected optimum speed for cutting the flanges. Resistors 127–130 are adjustable for that purpose.

When the ram has moved sufficiently far with respect to the probe that web torch 71 is approaching preheating position in respect to the web of the workpiece, the third probe stop 100c closes switch 121, energizing relay R8. This relay then closes contacts R8a and opens contacts R8b, changing the resistance in the ram motor armature circuit to reduce the ram drive speed. Contacts R8c also close to energize relay R16 which is locked in by its own contacts R16d. The resulting closure of contacts R16b and R16c energizes solenoid valve SV4 to admit acetylene automatically to the web torch which lights instantaneously. Actuation of relay R16 also closes contacts R16a to complete the circuits to time delay relays TDR24 and TDR26. The mentioned reduction in ram drive speed is appropriate at this point in the operation to permit the flange torches to maintain their cuts through the thick section in the vicinity of the web. At the expiration of this short delay period controlled by relay TDR26, its contacts TDR26a close, energizing relay R17. Contacts R17a and R17b are closed upon actuation of relay R17 thereby opening solenoid valve SV5 to admit preheat oxygen to the web torch. By the time the flange torches have advanced beyond the center of the beam, viz., have passed the web, guide rollers 75, extending beyond the end of the web torch, have come in contact with the surface of the web of the I-beam. As previously mentioned, these rollers maintain the web torch 71 correctly spaced from the surface of the web as the torch travels across it. Thereafter, as the ram continues to advance, the web torch merely slides back into the head of the ram as rails 70 (Fig. 5) roll under rollers 73.

At the termination of the time period controlled by relay TDR24, contacts TDR24a close, energizing relay R18 which is locked in by its own contacts R18d. At the same time, contacts R18b and R18c close, energizing solenoid valve SV6, admitting cutting oxygen to the web torch 71. Contacts R18a simultaneously close, energizing relay R12 to close contacts R12a and R12d and to open contacts R12b and R12c, as a result of which, web carriage motor 82 is actuated to move the web torch carriage downwardly at cutting speed under the control of motor controller 79.

As the ram advances further, the next probe stop 100d opens switch 122, thus deenergizing relay R8, opening contacts R8a and closing contacts R8b, which restores the speed of the ram drive motor to the original flange-cutting speed. Actuation of relay R8 also opens contacts R8c, but this produces no immediate affect because these contacts are at this time shunted by contacts R16d. The ram continues to advance until the flange torches have completed their cuts, at which point the last probe stop (not shown) closes switch 123 energizing relay R9. Actuation of relay R9 closes contacts R9a, energizing relay R19 which locks itself in by its own contacts R19c. Contacts R19a simultaneously open, stopping the ram motor 35. Contacts R19b also open, deenergizing relays R13, R14 and R15. This closes solenoid valves SV1, SV2 and SV3, cutting off the gas supplies to the flange torches. The de-energization of relay R13 opens contacts R13e which in turn opens the energizing circuit of relay TDR25.

The web torch 71 continues its cutting path down the web until the I-beam is severed, at which point the switch 91 is closed by contacting stop 87. This energizes relay R5 which opens contacts R5a, stopping the operation of web motor 82 and closing contacts R5b to energize relays R20 and R21. The resulting closure of contacts R20c locks relays R20 and R21 in the circuit. Actuation of relay R20 opens contacts R20a which de-energizes time delay relay TDR23. Simultaneously, contacts R20b are also opened to deactuate relays R12, R16 and R18, with the result that all of the gas to the web torch is shut off and time delay relays TDR24 and TDR26 are de-energized. In addition, contacts R20d are closed to energize relay R22. Actuation of relay R21 opens contacts R21a and closes contacts R21b, which, with the opening of contacts R12a, reverses the direction of rotation of web motor 82 so that it runs at full speed in the reverse direction because contacts R12c are closed and contacts R12d are open. In this manner the web carriage 65 is raised until it reaches the top at which point limit switch 91 again opens to de-energize relay R5. The mentioned actuation of relay R22 closes contacts R22a, reversing the ram drive motor 35 which had previously been stopped by the opening of contacts R19a. Also, contacts R22b open, thus de-energizing relays R10 and R11. Actuation of relay R22 closes its own contacts R22c, locking that relay in actuated position as long as contacts R1b are closed. When relay R10 is de-energized, ram motor 35 is connected to run at full speed. When the ram arrives at its starting position, limit switch 118 opens, thus de-energizing relay R3 which opens contact R3a and in turn de-energize relays R1 and R2. When the web carriage 65 is returned to its upper limit position, switch 89 opens, de-energizing relay R4. This opens contacts R4a, stopping the reverse drive of web motor 82. The deactuation of relays R3, R2 and R1 opens all of the remaining circuits which had been closed during operation, and completes the automatic cutting cycle, leaving the ram carriage and the web torch carriage in their respective starting positions.

In the foregoing description and in the appended claims the terms "horizontal" and "vertical" are used for brevity as illustrative of one embodiment of the invention, and are not intended as a limitation. Obviously these terms are relative, meaning mutually at an angle, and for example would be interchanged if the machine as a whole were rotated 90°.

What I claim is:

1. A cutting machine of the gas torch type including, a bed for supporting a workpiece, a ram movable horizontally toward and away from the workpiece, a platform on which said ram is movably supported independently of the workpiece to one side thereof, a carriage supported on said ram vertically movable with respect to said ram, a cutting torch carried by said ram and a cutting torch carried by said carriage, a probe carried by said ram and being adapted to contact a workpiece and being relatively movable with respect to said ram, first drive means for moving said ram horizontally, and second drive means independent of said first drive means for moving said carriage vertically, and control means connected to both of said drive means, actuated in response to the degree of movement of said probe on the ram and connected to automatically control each of said drive means independently at different degrees of movement of said probe.

2. A cutting machine of the gas torch type including, a bed for supporting a workpiece, a ram movable horizontally toward and away from the workpiece, a platform on which said ram is movably supported independently of the workpiece to one side thereof, a carriage supported on said ram vertically movable with respect to said ram, a first cutting torch carried by said ram and a second cutting torch carried by said carriage, said second torch being movable horizontally with respect to said carriage and with respect to said first torch, a probe carried by said ram, and probe being relatively movable horizontally with respect to said ram and adapted to contact the workpiece, first drive means for moving said ram in a horizontal direction, and second drive means independent of said first drive means for moving said carriage in a vertical direction, control means actuated in response to the degree of movement of said probe on the ram and connected to automatically control each of said drive means independently in accordance with the position of said probe and said ram, on spacing means maintaining said second torch at a fixed horizontal distance from the work surface which it cuts while said carriage moves vertically and said ram moves horizontally.

3. A cutting machine of the gas torch type including, a bed for supporting a workpiece, a ram movable horizontally toward and away from the workpiece, a platform on which said ram is movably supported independently of the workpiece to one side thereof, a carriage supported on said ram vertically movable with respect to said ram, a first cutting torch carried by said ram and a second cutting torch carried by said carriage, said second cutting torch being movable horizontally on said carriage, a probe carried by said ram, horizontally movable on said ram and adapted to contact the workpiece, first drive means for moving said ram in a horizontal direction, and second drive means independent of said first drive means for moving said carriage in a vertical direction, and control means automatically controlling each of said drive means independently in response to the position of said probe in respect to predetermined points on said ram.

4. In a machine according to claim 1, resilient means biasing said probe horizontally so as to maintain contact with the workpiece.

5. In a machine according to claim 2, resilient means biasing said probe horizontally with respect to said ram so as to maintain contact with the workpiece, and resilient means biasing said vertically moving torch horizontally with respect to said carriage so as to maintain said spacing means in contact with the workpiece.

6. A cutting machine of the gas torch type including, a bed for supporting a workpiece, first and second torches supported in said machine and separately movable so as to cut a workpiece in two different planes, sources of preheating and of cutting gases connected to said torches, control valves in the gas connections, first and second independent power means for moving said torches individually with respect to the workpiece, and control mechanism including a plurality of relay means and a plurality of switches connected thereto, said switches being automatically actuated respectively at different positions of said first torch with respect to the workpiece, a first one of said switches being connected to certain of said relay means, said certain relay means being connected to open a preheating gas valve associated with said first torch in response to actuation of a first of said switches and to deactuate the first of said power means, other of said relay means including a delay type relay connected after a predetermined period to open a cutting gas valve associated with said first torch and other of said relay means including a delay type relay connected after a predetermined period to reactuate said first power means, other of said relay means being connected to change the rate of movement of said first torch and to open a preheating gas valve associated with said second torch, said last named relay means including a delay type relay connected to open after a predetermined period a cutting gas valve associated with said second torch and to start said second power means, and means including a third of said switches connected to certain of said relay means and thence to said valves and power means such that actuation of said third switch closes said gas valves and reverses the direction of movement of both said power means.

7. A cutting machine of the gas torch type including, a bed for supporting a workpiece, a ram movable toward and away from the workpiece, a platform on which said ram is movably supported independently of the workpiece to one side thereof, driving means for moving said ram, a torch carried by said ram, a plate slidably supported on said ram, a probe attached to said plate and arranged to contact the workpiece, a plurality of movable stops secured to said plate, control switches positioned to be actuated in succession each by one of said stops, means for adjusting the positions of said stops on said plate, power means for energizing said driving means, gas valves for controlling the supply of gas to said torch and circuit connections between said switches, gas valves, driving means and power means.

8. A cutting machine of the gas torch type including, a bed for supporting a workpiece, a ram movable horizontally toward and away from the workpiece, a platform on which said ram is movably supported independently of the workpiece to one side thereof, vertical members secured at their lower ends to said ram, a carriage arranged to slide up and down on said vertical members, a first torch secured to said ram and movable, while cutting, horizontally with the ram a second torch mounted on said carriage and movable, while cutting, vertically with the carriage and horizontally with respect to the carriage, a torch arm carrying a third torch at one end and being adapted at the other end to slide vertically on one of said vertical members, clamping means fixing the cutting position of said arm on said member, and automatic control means controlling the horizontal movement of said ram and hence of said first and third torches and simultaneously controlling the vertical movement of said second torch on said vertical members, said automatic control means being actuated selectively to control the movement of the torches, respectively, in response to the position of said ram with respect to the workpiece.

9. In a cutting machine according to claim 8, guide means on said carriage on which said second torch is movable horizontally, means retaining said second torch in a fixed horizontal position with respect to the workpiece while it moves vertically with respect to the workpiece, and spacer means maintaining said second torch at a fixed distance from the workpiece.

10. A cutting machine of the gas torch type including, a bed for supporting a workpiece, a ram, a platform on which said ram is movable in a first direction, a plurality of torches positioned to cut a workpiece in different planes, a first of said torches being secured to said ram so as to move with it in said first direction, a carriage supported on said ram and movable with respect thereto in a second direction at an angle of less than 180° to said first direction, a mounting securing a second of said torches to said carriage, and torch-holding means slidable in said mounting in a third direction 180° to said first direction, and means for moving said carriage in said second direction while said ram and said mounting move relatively in said first and third directions.

11. A cutting machine of the gas torch type including, a bed for supporting a workpiece, a ram, a platform on which said ram is movable in a generally horizontal direction, a first torch secured to said ram and movable with it, a carriage supported on said ram and movable with it, said carriage being independently movable on said ram in a generally vertical direction, a second torch mounted on said carriage so as to be movable with it vertically but free to move with respect to it horizontally, and means for retaining said second torch horizontally fixed with respect to the workpiece when said second torch is in operable relation to the workpiece.

12. A cutting machine of the gas torch type including, a bed for supporting a workpiece, a ram, a platform on which said ram is movable with respect to the workpiece in a first direction, a carriage supported on said ram and movable with it, said carriage being independently movable on said ram in a second direction at an angle to said first direction, a torch mounted on said carriage by means imparting to said torch a component of movement in said second direction, and means for retaining said torch fixed with respect to the workpiece in said first direction while said carriage moves with respect to the workpiece simultaneously in both said first and second directions.

13. A cutting machine of the gas torch type including, a bed for supporting a workpiece, a ram, a platform positioned to one side of said bed on which said ram is movable in a first direction, a plurality of torches adapted to cut the workpiece in different directions, a first of said torches being secured to said ram so as to move with it, first driving means for moving said ram and hence said first torch in said first direction during cutting with respect to the workpiece, carriage means movable on said ram in a second direction supporting a second of said torches, second driving means for moving said second torch in said second direction, said driving means being independently operable as to speed and direction of drive, and control means operable in response to the relative position of said ram and said workpiece for controlling the speed and direction of drive of both of said driving means.

14. A cutting machine of the gas torch type including, a bed for supporting a workpiece, a ram, a platform positioned to one side of said bed on which said ram is movable in a first direction, a plurality of torches, a first of said torches being secured to said ram so as to move with it, a slide rail mounted on said ram at right angles to said first direction in which said ram moves, a second torch adjustably mounted on said slide rail and movable with said ram and said first torch, first driving means for moving said ram and hence said first and second torches in said first direction during cutting, a carriage means slidable in a second direction along said rail, torch mounting means on said carriage, a third torch secured to said torch mounting means, said third torch and said carriage being relatively movable in said first direction, means for retaining said third torch at a fixed distance from the workpiece while said carriage moves said third torch in said second direction, second driving means for moving said carriage along said rail in said second direction, said first and second driving means being independently operable as to speed and direction of drive, and control means operable in response to successive relative positions of said ram and said workpiece for separately controlling the speed and direction of drive of each of said driving means.

JOSEPH M. TYRNER.

REFERENCES CITED

The following references are of record in the file of this patent:

UNITED STATES PATENTS

| Number | Name | Date |
|---|---|---|
| 1,698,173 | Royer | Jan. 8, 1929 |
| 1,915,912 | Anderson | June 27, 1933 |
| 2,266,208 | Jones | Dec. 16, 1941 |
| 2,277,054 | Anderson | Mar. 24, 1942 |
| 2,334,301 | Young | Nov. 16, 1943 |
| 2,404,600 | Scovill, Jr. | July 23, 1946 |
| 2,405,945 | Ehemann, Jr. | Aug. 20, 1946 |
| 2,424,270 | Ehemann, Jr. et al. | July 22, 1947 |
| 2,443,251 | Keller | June 15, 1948 |
| 2,448,657 | Bucknam | Sept. 7, 1948 |
| 2,482,188 | Jones et al. | Sept. 20, 1949 |
| 2,504,171 | Anderson | Apr. 18, 1950 |

FOREIGN PATENTS

| Number | Country | Date |
|---|---|---|
| 36,742 | Switzerland | Mar. 14, 1906 |

OTHER REFERENCES

German application, 499,116, May 21, 1948. (From U. S. Dept. of Commerce Office of Technical Service's Bibliography of Scientific and Industrial Reports, vol. 9, No. 8, page 720, PB83393, frames 145–148, published May 21, 1948.)